Figure 10:
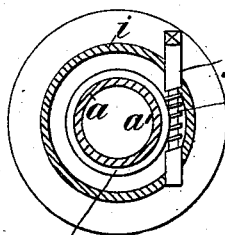

No. 721,394. PATENTED FEB. 24, 1903.
L. ROTTENBURG.
BELT GEARING.
APPLICATION FILED JULY 2, 1900.
NO MODEL. 4 SHEETS—SHEET 1.
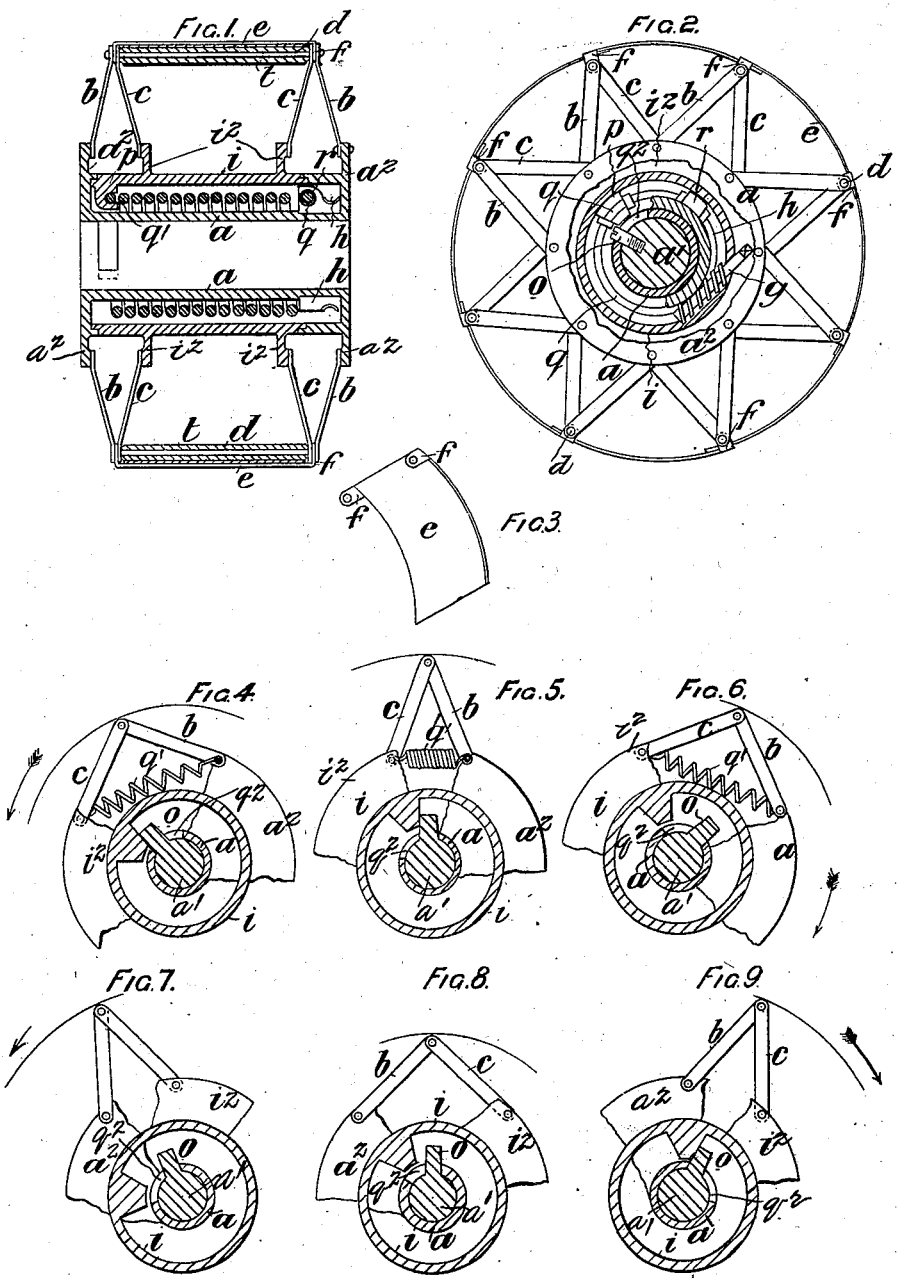

No. 721,394. PATENTED FEB. 24, 1903.
L. ROTTENBURG.
BELT GEARING.
APPLICATION FILED JULY 2, 1900.
NO MODEL. 4 SHEETS—SHEET 2.

No. 721,394. PATENTED FEB. 24, 1903.
L. ROTTENBURG.
BELT GEARING.
APPLICATION FILED JULY 2, 1900.
NO MODEL. 4 SHEETS—SHEET 3.
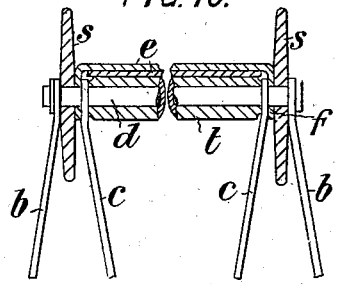
Fig. 16.
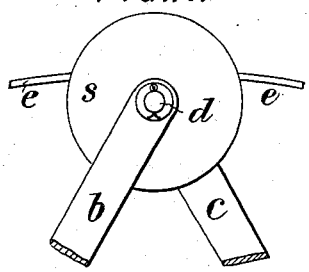
Fig. 17.
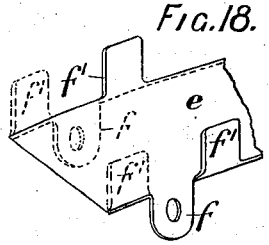
Fig. 18.
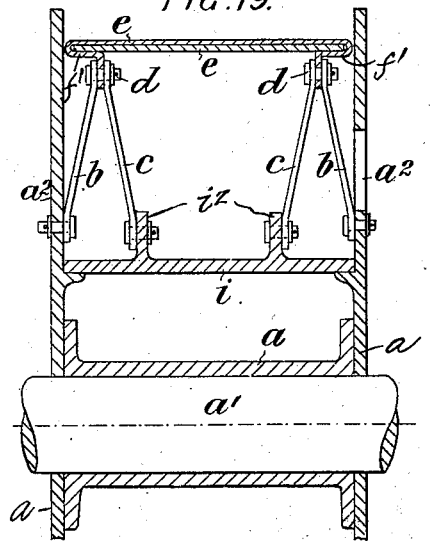
Fig. 19.
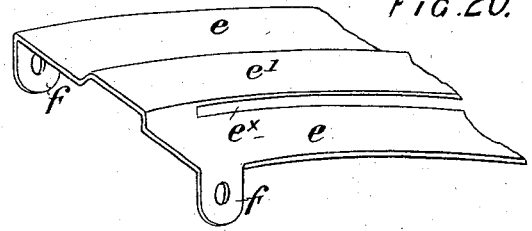
Fig. 20.
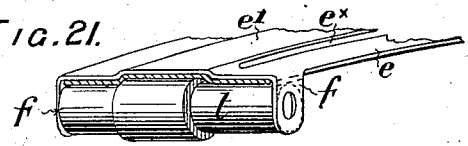
Fig. 21.
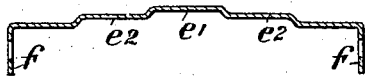
Fig. 22.
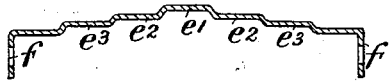
Fig. 23.
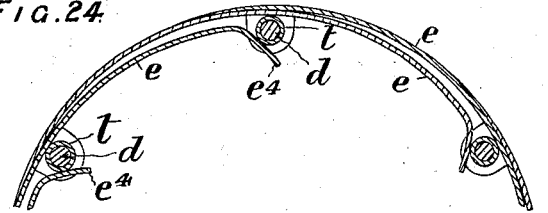
Fig. 24.
Fig. 25.
Witnesses
Inventor,
Louis Rottenburg,
by
Atty

UNITED STATES PATENT OFFICE.

LOUIS ROTTENBURG, OF PAISLEY, SCOTLAND.

BELT-GEARING.

SPECIFICATION forming part of Letters Patent No. 721,394, dated February 24, 1903.

Application filed July 2, 1900. Serial No. 22,355. (No model.)

*To all whom it may concern:*

Be it known that I, LOUIS ROTTENBURG, engineer, a subject of the Queen of Great Britain, residing at Tatella Works, Paisley, Scotland, have invented a new and useful Improved Belt-Gearing for Varying Loads and Speeds, of which the following is a specification.

My invention relates to an improved belt-gearing.

According to my invention the pulley is provided with a hub made in two parts, each part having the same axis and being provided with one or more sets of pivoted spokes, each of which or each set of which is at its outer end pivoted to and supports or assists in supporting the expanding and contracting rim or tread, which is made of one or more pieces. As indicated, the expanding and contracting rim is or may be made up of one or a number of parts which is or are flexible or elastic and adapted to slide into or over each other or to be in some way capable of reducing and increasing the size of the periphery of the wheel. When the pulley is intended to revolve in one direction only, one of the two aforesaid parts of the hub is, for example, keyed to or in some way constrained to move with the shaft on which the whole wheel is mounted, and the other of the two aforesaid parts of the hub is allowed entire or partial freedom of movement on the shaft or on the other part of the hub, or both parts are allowed partial freedom of movement on the shaft when the wheel is intended to revolve in both directions. The spokes of one part of the hub slant, say, in one direction, and the spokes of the other part of the hub slope in the other direction. It follows that if one part of the hub be constrained to move independently of the other part of the hub the pivoted spokes of one part of the hub will assume a different position with regard to the spokes of the other part of the hub, the result of which will be that the rim-sections will be caused to move farther away from or nearer to the axis of the wheel, or in the case where the rim is formed of a single piece the ends thereof will be caused to overlap more or less—that is to say, the tangential pull of the belt tends to reduce the diameter of the driving-pulley while it also tends to increase the diameter of the driven pulley. The two parts of the hub may be connected together by a spring, for example, in which case the change in diameter in one—say the driving—pulley, if there be two pulleys, will be regulated automatically by the tangential pull on the belt, the said spring between the two hub parts opposing the contracting action of the belt pull, and as this pulley becomes reduced in diameter, for instance, the other—say the driven wheel—will increase in diameter owing to the constant tendency of the tangential pull of the belt above referred to, aided by the spring between the two hub parts, to cause the two sets of spokes to produce an enlargement in the diameter of the said driven pulley. In order to permit of adjusting the spring, a worm-wheel is, for instance, freely mounted on one part of the hub, one end of the spring being attached thereto, and gearing therewith is a worm revolving in bearings in the same part of the hub, which worm is controlled from the outside of the pulley. I may thus set the spring of the pulley so as to suit the most efficient torque of the motor.

An automatically expanding and contracting pulley of the kind described can be used with a pulley of ordinary construction, provided that the slack of the belt be taken up as required in any well-known and convenient manner. Instead of making pulleys of this description to regulate their respective diameters automatically and in accordance with the resistance or load experienced, so as to maintain as nearly as may be a constant speed of the motor or driving-pulley whatever the load may be, or, on the other hand, with a constant load to maintain as nearly as may be a constant speed of the driven pulley whatever the speed of the motor or driving-pulley may be, I may also construct wheels or pulleys in which the alteration in diameter is caused constrainedly or by means entirely outside of the wheel or pulley itself—that is to say, I may vary the relative positions of or angles between the spokes on one hub part and those on the other hub part, and consequently the diameter of the wheel when at rest — by means, for instance, of a worm mounted in bearings in one part of the hub and gearing with a worm-wheel attached to the other part of the hub, or when in motion by means of a diagonally-cut rack actuated by a fork and collar and sliding parallel to the axis in one hub part, such rack engaging in a diagonally-cut pinion concentric with and fixed to the other hub part, or by means of a wedge or wedges, for example, between the spokes of one hub part and the spokes of the other hub part, or in any other convenient manner, there being, if desired, a spring to cause one hub part to keep or to tend to keep in a certain position with regard to the other hub part. I may also employ a pulley constructed according to my invention constrainedly operated with a pulley automatically operated or with a pulley of ordinary construction, provided that the slack of the belt be taken up as required in any well-known and convenient manner.

My invention is of special utility for use in connection with motor-cars for varying the speed at which the car shall run in a simple manner and is also applicable to many purposes where a variation of speed is required either automatically or constrainedly, or both automatically and constrainedly.

In the accompanying sheets of drawings I have shown various forms of carrying out my invention, and in which—

Figure 11:
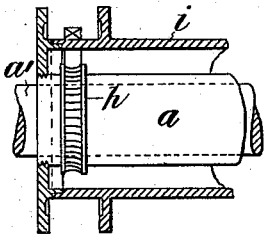
Figure 12:
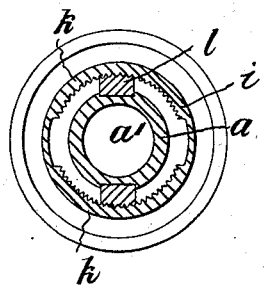
Figure 13:
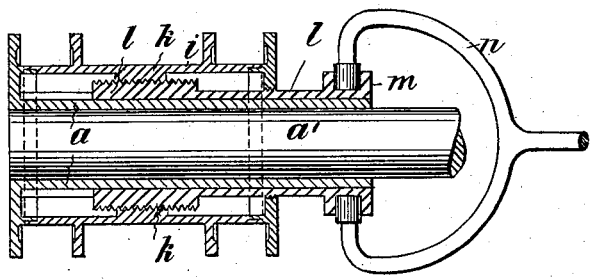
Figure 14:
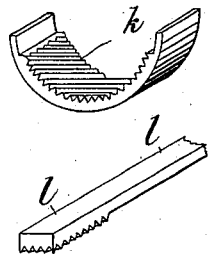
Figure 15:
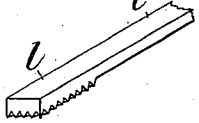
Figure 26:
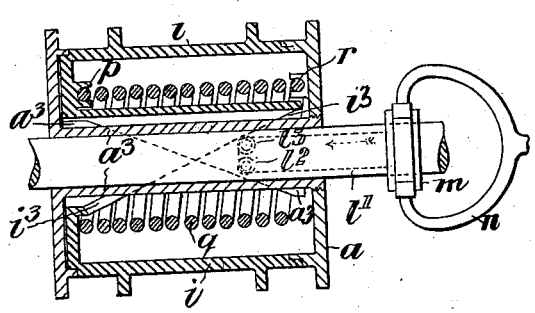
Figure 27:
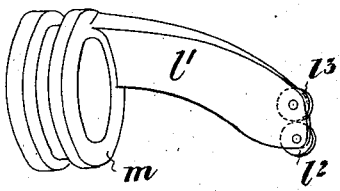
Figure 28:
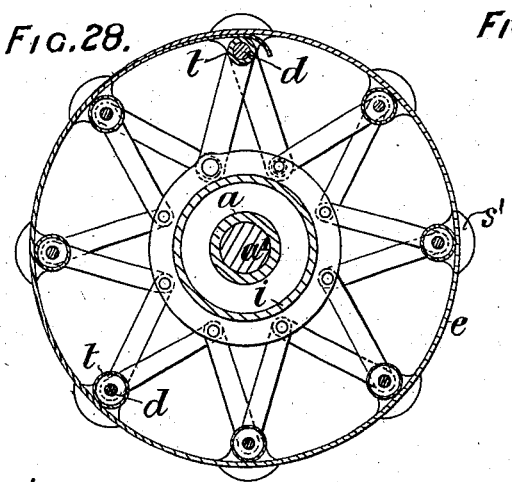
Figure 29:
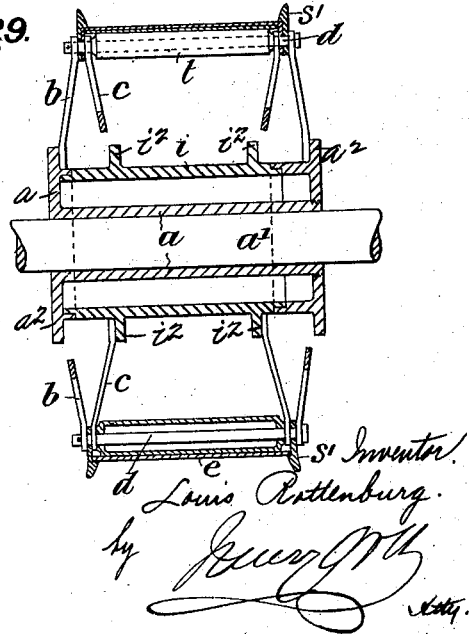

Figure 1 is a section of one form of a spring-controlled expanding or contracting pulley. Fig. 2 is an elevation of the same, partly in section. Fig. 3 is a detail showing a rim-section in perspective. Figs. 4, 5, and 6 are diagrams showing the driving-pulley under different conditions. Figs. 7, 8, and 9 are diagrams showing a driven pulley under different conditions. Figs. 10 and 11 are transverse and longitudinal sections, respectively, showing means for adjusting the diameter of the pulley when at rest. Figs. 12 and 13 are respectively transverse and longitudinal sections showing means for adjusting the diameter of the pulley when in motion, and Figs. 14 and 15 are detail views of a portion thereof. Figs. 16, 17, and 18 are detail views showing means for retaining the belt on the pulley. Fig. 19 shows a modified construction of pulley for preventing the belt from running off. Fig. 20 is a perspective view of a rim-section provided with a flexible or elastic step or steps as a substitute for the usual camber. Fig. 21 is a perspective view of the rollers for carrying the stepped form of rim-section. Figs. 22 and 23 show other sections of the stepped form of rims. Fig. 24 shows a modified form of rim-section, the pulley being contracted; and Fig. 25 shows the same rim-sections, the pulley being expanded. Fig. 26 is a section of the hub of a spring-controlled pulley provided also with means for controlling the maximum diameter of the pulley when in motion. Fig. 27 shows a modified form of controlling-bar. Figs. 28 and 29 are respectively plan and section of a pulley with the rim in one piece and provided with means for retaining the belt on the pulley.

Referring to Figs. 1 to 3, the hub of the pulley is formed in two parts—that is to say, an outer hub part $a$ and an inner hub part $i$—one of which, according to the direction in which the pulley revolves, is constrained to move with the shaft $a'$, Fig. 2, by means of a feather or pin $o$, the inner hub part $i$ being suitably mounted so as to be capable of being partially revolved relatively to the hub part $a$ and shaft $a'$. The inner hub part $i$ is driven by means of a lug $p$, against which the pin $o$ bears, said pin working in a slot $q^2$, Fig. 2, in the outer hub part $a$ and bearing against one end of said slot when driving the said outer hub part. The hub parts $a$ and $i$ are connected together by a torsional spring $q$, one end of which is attached to the aforesaid lug $p$ on the inner hub part, the other end being attached to a lug $r$ on a worm-wheel $h$, mounted freely on the outer hub part $a$ and controlled by a worm $g$, revolving in bearings in the said outer hub part, whereby the desired torsion on the spring $q$ may be attained by means of a spanner or key. To suitable lugs or flanges $a^3$ and $i^2$ on the aforesaid inner and outer hub parts $a$ and $i$, respectively, are pivoted, respectively, the two sets of spokes $c$ and $b$, the outer ends of each pair of inner and outer hub-spokes being pivoted by a pin $d$ to one of two cheeks $f$ at one end of each rim-section $e$. Each rim-section $e$ is of sufficient length, when the pulley is expanded to its fullest extent, to overlap the next succeeding rim-section, the end being preferably supported on a roller or rollers $t$, carried by the aforesaid pivot-pin $d$ in the next succeeding pin-section. The influence of the tangential pull of the belt on a pulley thus constructed is clearly shown in the diagram Figs. 4 to 6, a helical spring $q'$ in tension being, however, substituted for the sake of simplicity for the torsional spring $q$. (Shown in Figs. 1 and 2.) In Fig. 4 a driving-pulley, driving by the left, is shown in its most contracted condition. In Fig. 5 the same pulley is shown at rest, and therefore in its most extended condition, while in Fig. 6 the same pulley is shown driving by the right in its most contracted condition.

In the driven pulley the spring $q$ is omitted or replaced by a light spring of sufficient strength only as to tend to expand the pulley. The action of such a driven pulley is clearly shown in the diagram Figs. 7, 8, and 9. The pulley is shown as being driven by the left in Fig. 7 and in an expanded condition. In Fig. 8 the same pulley is shown at rest, and therefore in its most contracted condition, while in Fig. 9 the same pulley is shown in an expanded condition, being driven by the right.

In Figs. 10 and 11 I have shown means for adjusting as desired the diameter of the pulley when at rest. In bearings in the inner hub part $i$, which is freely mounted on the outer hub part $a$, keyed to the shaft $a'$, is a worm $g$, which gears with a worm-wheel $h$, fixed to the outer hub part $a$. One end of the worm $g$ extends beyond the hub and can be caused to revolve by a suitable key or spanner.

Referring to Figs. 12 to 15, in which I have shown means for adjusting the diameter of the pulley when in motion as well as at rest and from a distance, the outer hub part $a$ is keyed to the shaft $a'$ and the inner hub part $i$ is freely mounted on the said outer hub part. In two diametrically opposite slots in the sleeve of the outer hub part $a$ I provide sliding racks $l$, having diagonally-cut teeth, (see Fig. 15,) both of which gear with corresponding diagonal internal teeth $k$ on the inner hub part $i$. (See Fig. 14.) One end of the racks $l$ extends beyond the outer face of the hub part $a$, and attached thereto is a collar $m$, operated by a fork $n$. By causing the collar $m$ to slide to or fro the racks $l$ are reciprocally moved, and the relative positions of the inner and outer hub parts, and therefore the diameter of the pulley, may be adjusted.

In Figs. 16 to 19 I have shown various means for preventing the belt from running off the pulley when the rim-sections are flat. Referring to Figs. 16 and 17, I may mount freely on each pivot-pin $d$, between the cheeks $f$ and the spoke $b$, a washer or disk $s$, or, as shown in Fig. 18, I may provide on each side of each rim-section one or more cheeks $f'$, or, again, as shown in Fig. 19, the flange $a^2$ of the outer hub part $a$ may be increased in diameter so as to extend beyond the rim of the pulley when in its most expanded position. In this case the pivot-flanges $f'$ on the rim-sections are made of sufficient length to be bent inwardly and then radially, thus forming also guides in which the rim-sections slide and are guided. The effect of the ordinary camber on the periphery may be attained by making the rim-section step-like in section, as shown at $e'$ in Fig. 20, the elasticity or flexibility of the rim-section being maintained by cutting away the rising portions, as shown at $e^x$, with the exception of a short length at the pivoted end of the rim-section. The rollers $t$ in such case are stepped to correspond with the section of the rim parts, as shown in Fig. 21. The ordinary camber may be more nearly simulated by providing an equal number of steps on either side of the central step $e'$, as shown at $e^2$ $e^2$ and $e^2$ $e^3$ in Figs. 22 and 23, respectively.

In order to allow the pulley to be contracted to less than half its expanded diameter, the end $e^4$ of each rim-section $e$ may be bent or turned inward, so as to pass over the next succeeding roller $t$ on pivot $d$ on the side nearest the center of the pulley, as shown in Fig. 24, and also when the pulley is fully expanded said bent ends $e^4$ will act as stops to limit further expansion by contacting with the rollers $t$ on pivot $d$, as shown in Fig. 25. It will be obvious that in this construction the rim-sections can be drawn out circumferentially a distance equal to that between two rollers $t$, the diameter of the wheel being increased to twice its normal diameter.

In Fig. 27 I have shown means for controlling, either when in motion or at rest, the maximum diameter of the automatic pulley described with reference to Figs. 1, 2, 3, and 26. In this construction the worm and worm-wheel for adjusting the torsion of the spring $q$ are omitted for the sake of simplicity, one end of said spring being shown as attached to a lug $p$ on the inner hub part $i$ and the other end to a lug $r$ on the outer hub part $a$. The periphery of the sleeve of the outer hub $a$ is provided with a helical rib or abutment $a^3$, and the inner hub $i$ is provided with an inner sleeve cut away so as to form a helical flange or abutment $i^3$ of equal pitch to that of the abutment $a^3$, but of a reverse direction. A controlling rod or bar $l'$, passing through a slot in the outer hub part $a$, carries two rollers, one of which, $l^2$, bears against the abutment $a^3$, while the other, $l^3$, bears against the abutment $i^3$. This bar is operated by a sliding collar $m$ and a fork $n$. When the bar $l'$ is moved in the direction of the arrow, Fig. 26, the pulley is prevented from expanding beyond the desired limit, but is free to contract against the influence of the spring $q$ by the pull of the belt. As shown in Fig. 27, the controlling-bar $l'$ may be curved or helically bent in order to reduce the size of the slot in the outer hub. This arrangement is especially advantageous for controlling the maximum speed of a motor-car in town traffic.

In Figs. 28 and 29 I have shown a pulley constructed according to my invention with a rim $e$, formed of a single strip, the ends of which overlap. The rim is held in shape by clips $s'$ on the pivot-pins $d$, which also serve to retain the belt on the pulley.

What I claim as my invention, and desire to secure by Letters Patent, is—

1. An expansible pulley comprising an expansible rim, a hub composed of independently-revoluble concentric parts and pairs of spokes, each pair pivotally connected at one end to a common pivot on the rim, the opposite ends of the spokes of a pair pivotally connected to the inner and outer hub portions respectively, for the purposes set forth.

2. An expansible pulley, comprising an expansible rim, a hub composed of independently-revoluble concentric parts, pairs of spokes, each pair pivotally connected at one end to a common pivot on the rim, the opposite ends of the spokes of a pair pivotally connected to the inner and outer hub parts, and means operating to automatically restore the pulley to a normal diameter.

3. An expansible pulley, comprising an expansible rim, a hub composed of independently-revoluble concentric parts, pairs of spokes, each pair pivotally connected at one end to a common pivot on the rim, the opposite ends of the spokes of a pair pivotally connected to the inner and outer hub parts respectively, and means for adjusting the diameter of the pulley to one between a maximum and minimum diameter, for the purpose set forth.

4. An expansible pulley, comprising an expansible rim, a hub composed of independently-revoluble concentric parts, pairs of spokes, each pair connected at one end to a common pivot on the rim, the opposite ends of the spokes of a pair pivotally connected to the inner and outer hub parts respectively, means for adjusting the diameter of the pulley to one between a maximum and minimum diameter, and means operating to automatically restore the pulley to its adjusted diameter, for the purpose set forth.

5. An expansible pulley, comprising an expansible rim provided with bearings on opposite edges, pivot-pins revoluble in said bearings, rollers loosely mounted thereon and supporting the rim, and a hub composed of independently-revoluble concentric parts; in combination with two pairs of spokes for each pivot-pin, one end of the said spokes pivotally connected to said pin and the opposite ends of the spokes of a pair pivotally connected to the inner and outer hub parts respectively, for the purpose set forth.

6. An expansible pulley, comprising an expansible rim, a hub composed of independently-revoluble concentric hub parts, pairs of spokes, each pair pivotally connected to a common pivot on said rim, the opposite ends of the spokes of a pair pivotally connected to the inner and outer hub parts respectively; in combination with means preventing the belt from slipping off the pulley, substantially as set forth.

7. An expansible pulley, comprising an expansible rim, a hub composed of independently-revoluble concentric hub parts, pairs of spokes, each pair pivotally connected to a common pivot on said rim, the opposite ends of the spokes of a pair pivotally connected to the inner and outer hub parts respectively; in combination with means integral with the rim preventing the belt from slipping off the pulley, substantially as set forth.

8. An expansible pulley comprising an expansible rim stepped in cross-section from its edges to a central portion, a hub composed of independently-revoluble parts and pairs of spokes, each pair pivotally connected at one end to a common pivot on the rim, the opposite ends of the spokes of a pair pivotally connected to the inner and outer hub portions, for the purpose set forth.

9. In an expansible pulley, an expansible rim stepped in cross-section from its edges to a central portion, the vertical walls of the latter portion slotted for a portion or portions of its length, for the purpose set forth.

10. An expansible pulley, comprising a sectional expansible rim, a hub composed of independently-revoluble parts, and pairs of spokes for each rim-section, one end of the spokes of a pair pivotally connected to said rim-section and the opposite ends of the spokes of each pair pivotally connected to the inner and outer hub parts respectively, for the purpose set forth.

11. An expansible pulley comprising a sectional expansible rim having inwardly-bent ends $e^4$, bearings at diametrically opposite points of said sections, pivot-pins mounted in said bearings, rollers carried by said pins, and two pairs of spokes for each of said pins, one end of the spokes of a pair pivoted to a pin, the opposite ends of the spokes of a pair pivotally connected to the inner and outer hub parts respectively, for the purpose set forth.

12. An expansible pulley, comprising an expansible rim stepped in cross-section from its edges to a central portion, the vertical walls of said central portion slotted for a portion of their length, a hub composed of independently-revoluble concentric parts and pairs of spokes, each pair pivotally connected at one end to a common pivot on the rim, the opposite ends of the spokes of a pair pivotally connected to inner and outer hub parts respectively, for the purpose set forth.

In testimony whereof I have signed my name to this specification in the presence of two subscribing witnesses.

LOUIS ROTTENBURG.

Witnesses:
 JNO. M. GADZEAN,
 F. A. ROTTENBURG.